United States Patent
Ly et al.

(10) Patent No.: US 11,894,950 B2
(45) Date of Patent: Feb. 6, 2024

(54) PROCESSING TIME FOR JOINT CHANNEL ESTIMATION

(71) Applicant: QUALCOMM Incorporated, San Diego, CA (US)

(72) Inventors: Hung Dinh Ly, San Diego, CA (US); Mostafa Khoshnevisan, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 17/249,704

(22) Filed: Mar. 10, 2021

(65) Prior Publication Data

US 2022/0294667 A1    Sep. 15, 2022

(51) Int. Cl.
*H04L 25/02* (2006.01)
*H04L 5/00* (2006.01)
*H04W 72/0446* (2023.01)
*H04W 72/23* (2023.01)
*H04W 72/50* (2023.01)

(52) U.S. Cl.
CPC ........ *H04L 25/0204* (2013.01); *H04L 5/0051* (2013.01); *H04W 72/0446* (2013.01); *H04W 72/23* (2023.01); *H04W 72/535* (2023.01)

(58) Field of Classification Search
CPC ............ H04L 25/0204; H04L 5/0051; H04W 72/0446; H04W 72/1257; H04W 72/1289
See application file for complete search history.

(56) References Cited

U.S. PATENT DOCUMENTS

| | | | |
|---|---|---|---|
| 2019/0222380 A1* | 7/2019 | Manolakos | H04L 1/08 |
| 2021/0022159 A1* | 1/2021 | Feng | H04W 56/0045 |
| 2022/0303073 A1* | 9/2022 | Yao | H04W 72/042 |

FOREIGN PATENT DOCUMENTS

| | | | |
|---|---|---|---|
| WO | WO-2021000120 A1 * | 1/2021 | |
| WO | WO-2021196880 A1 * | 10/2021 | |
| WO | WO-2022061628 A1 * | 3/2022 | |

OTHER PUBLICATIONS

International Search Report and Written Opinion—PCT/US2022/070943—ISA/EPO—dated May 30, 2022.

(Continued)

*Primary Examiner* — Chae S Lee
(74) *Attorney, Agent, or Firm* — Harrity & Harrity, LLP

(57) ABSTRACT

Various aspects of the present disclosure generally relate to wireless communication. In some aspects, a user equipment (UE) may receive demodulation reference signals (DMRSs) in multiple physical downlink shared channel (PDSCH) reception occasions. The UE may perform joint channel estimation using the DMRSs in the multiple PDSCH reception occasions. The UE may transmit a feedback message after a processing time that includes an offset associated with the joint channel estimation, wherein the processing time starts after a last symbol of a PDSCH reception occasion of the multiple PDSCH reception occasions and ends before a first symbol of the feedback message. Numerous other aspects are described.

30 Claims, 12 Drawing Sheets

(56) References Cited

OTHER PUBLICATIONS

ITL: "Considerations for Coverage Recovery", 3GPP TSG RAN WG1 #103-e, R1-2008876, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 22, 2020, 4 Pages, XP051941584.
Moderator (LG Electronics): "Summary #2 of POSCH/PUSCH Enhancements (Scheduling/HARQ)", 3GPP TSG RAN WG1 #104-e, R1-2101858, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 30, 2021, 30 Pages, XP051975946.

\* cited by examiner

Table 5.3-1: PDSCH processing time for PDSCH processing capability 1

| $\mu$ | PDSCH decoding time $N_1$ [symbols] | |
|---|---|---|
| | dmrs-AdditionalPosition = 'pos0' in DMRS-DownlinkConfig in both of dmrs-DownlinkForPDSCH-MappingTypeA, dmrs-DownlinkForPDSCH-MappingTypeB | dmrs-AdditionalPosition ≠ 'pos0' in DMRS-DownlinkConfig in either of dmrs-DownlinkForPDSCH-MappingTypeA, dmrs-DownlinkForPDSCH-MappingTypeB or if the higher layer parameter is not configured $N_{1,0}$ |
| 0 | 8 | 13 |
| 1 | 10 | 13 |
| 2 | 17 | 20 |
| 3 | 20 | 24 |

500

Table 5.3-2: PDSCH processing time for PDSCH processing capability 2

| $\mu$ | PDSCH decoding time $N_1$ [symbols] dmrs-AdditionalPosition = 'pos0' in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 for frequency range 1 |

PROCESSING TIME FOR JOINT CHANNEL ESTIMATION

FIELD OF THE DISCLOSURE

Aspects of the present disclosure generally relate to wireless communication and to techniques and apparatuses associated with a processing time for joint channel estimation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving demodulation reference signals (DMRSs) in multiple physical downlink shared channel (PDSCH) reception occasions and performing joint channel estimation using the DMRSs in the multiple PDSCH reception occasions. The method may include transmitting a feedback message after a processing time that includes an offset associated with the joint channel estimation. The processing time may start after a last symbol of a PDSCH reception occasion of the multiple PDSCH reception occasions and end before a first symbol of the feedback message.

In some aspects, a method of wireless communication performed by a base station includes transmitting, to a UE, DMRSs in PDSCH reception occasions, and receiving, from the UE, a feedback message based at least in part on a processing time at the UE. The processing time may include an offset associated with joint channel estimation of the DMRSs.

In some aspects, a UE for wireless communication includes a memory and one or more processors, operatively coupled to the memory, configured to receive DMRSs in multiple PDSCH reception occasions and perform joint channel estimation using the DMRSs in the multiple PDSCH reception occasions. The one or more processors may be configured to transmit a feedback message after a processing time that includes an offset associated with the joint channel estimation, where the processing time starts after a last symbol of a PDSCH reception occasion of the multiple PDSCH reception occasions and ends before a first symbol of the feedback message.

In some aspects, a base station for wireless communication includes a memory and one or more processors, operatively coupled to the memory, configured to transmit, to a UE, DMRSs in multiple PDSCH reception occasions, and receive, from the UE, a feedback message based at least in part on a processing time at the UE, where the processing time includes an offset associated with joint channel estimation of the DMRSs.

In some aspects, a non-transitory computer-readable medium storing a set of instructions for wireless communication includes one or more instructions that, when executed by one or more processors of a UE, cause the UE to receive DMRSs in multiple PDSCH reception occasions, perform joint channel estimation using the DMRSs in the multiple PDSCH reception occasions, and transmit a feedback message after a processing time that includes an offset associated with the joint channel estimation, where the processing time starts after a last symbol of a PDSCH reception occasion of the multiple PDSCH reception occasions and ends before a first symbol of the feedback message.

In some aspects, a non-transitory computer-readable medium storing a set of instructions for wireless communication includes one or more instructions that, when executed by one or more processors of a base station, cause the base station to transmit, to a UE, DMRSs in multiple PDSCH reception occasions, and receive, from the UE, a feedback message based at least in part on a processing time at the UE, where the processing time includes an offset associated with joint channel estimation of the DMRSs.

In some aspects, an apparatus for wireless communication includes means for receiving DMRSs in multiple PDSCH reception occasions, means for performing joint channel estimation using the DMRSs in the multiple PDSCH reception occasions, and means for transmitting a feedback message after a processing time that includes an offset associated with the joint channel estimation, where the processing time starts after a last symbol of a PDSCH reception occasion of the multiple PDSCH reception occasions and ends before a first symbol of the feedback message.

In some aspects, an apparatus for wireless communication includes means for transmitting, to a UE, DMRSs in multiple PDSCH reception occasions, and means for receiving, from the UE, a feedback message based at least in part on a processing time at the UE, where the processing time includes an offset associated with joint channel estimation of the DMRSs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating examples of subcarrier spacing configuration values that contribute to a processing time for feedback, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
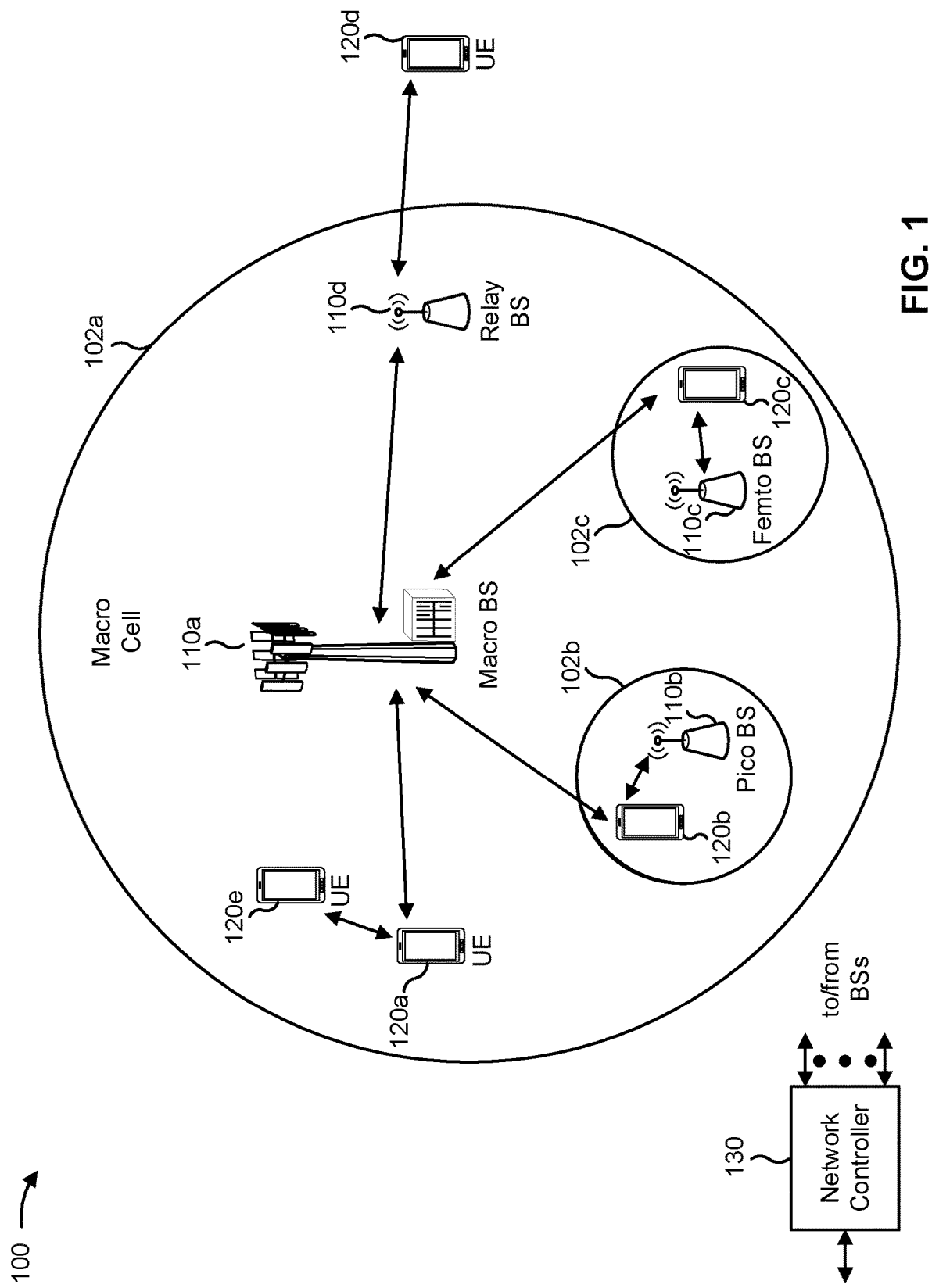
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). The UE 120 may be included inside a housing that houses components of the UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz–300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
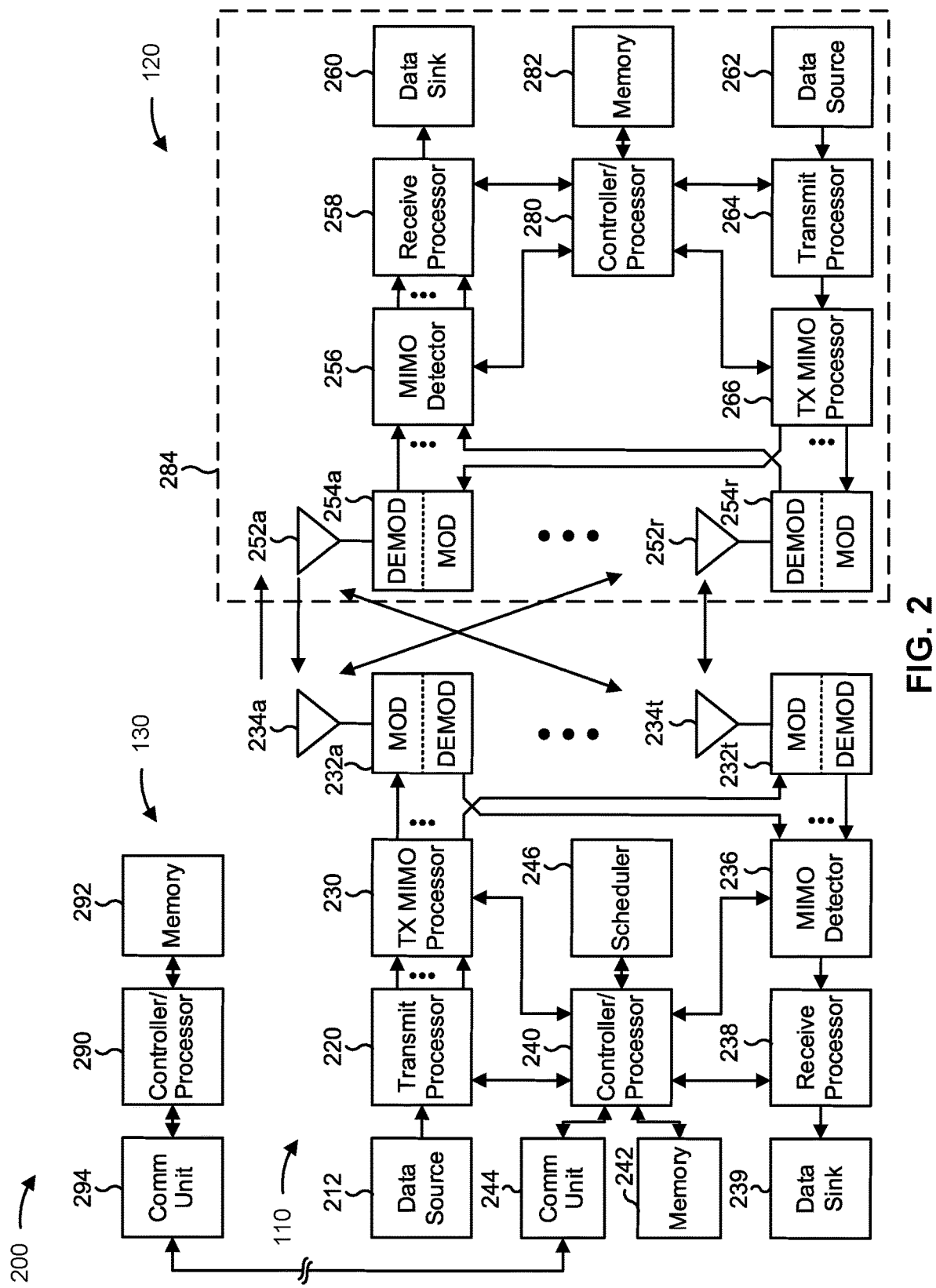
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with T antennas 234a through 234t, and the UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. The transmit processor 220 may also process system information (e.g., for semi-static resource partitioning information (SRPI)) and control information (e.g., CQI requests, grants, and/or upper layer signaling) and provide overhead symbols and control symbols. The transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of the UE 120 may be included in a housing 284.

The network controller 130 may include communication unit 294, controller/processor 290, and memory 292. The network controller 130 may include, for example, one or more devices in a core network. The network controller 130 may communicate with the base station 110 via the communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM or CP-OFDM) and transmitted to the base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and the memory 282 to perform aspects of any of the methods described herein (for example, as described with reference to FIGS. 1-12).

At the base station 110, the uplink signals from the UE 120 and other UEs may be received by antennas 234, processed by demodulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240. The base station 110 may include the communication unit 244 and communicate to the network controller 130 via the communication unit 244. The base station 110 may include a scheduler 246 to schedule the UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s)

234, modulators and/or demodulators 232, MIMO detector 236, receive processor 238, transmit processor 220, and/or TX MIMO processor 230. The transceiver may be used by a processor (e.g., controller/processor 240) and the memory 242 to perform aspects of any of the methods described herein (for example, as described with reference to FIGS. 1-12).

The controller/processor 240 of the base station 110, the controller/processor 280 of the UE 120, and/or any other component(s) of FIG. 2 may perform one or more techniques associated with a processing time for joint channel estimation, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memories 242 and 282 may store data and program codes for the base station 110 and the UE 120, respectively. In some aspects, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, the UE 120 includes means for receiving DMRSs in multiple PDSCH reception occasions, means for performing joint channel estimation using the DMRSs in the multiple PDSCH reception occasions, and/or means for transmitting a feedback message after a processing time that includes an offset associated with the joint channel estimation, where the processing time starts after a last symbol of a PDSCH reception occasion of the multiple PDSCH reception occasions and ends before a first symbol of the feedback message. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station 110 includes means for transmitting, to a UE, DMRSs in multiple PDSCH reception occasions, and/or means for receiving, from the UE, a feedback message based at least in part on a processing time at the UE, where the processing time includes an offset associated with joint channel estimation of the DMRSs. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for transmitting, to the UE, a configuration for the joint channel estimation. In some aspects, the base station 110 includes means for transmitting, to the UE, an indication of whether joint channel estimation is enabled for the DMRSs in the multiple PDSCH reception occasions. In some aspects, the base station 110 includes means for transmitting the offset to the UE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Uplink channels and uplink reference signals may carry information from a UE to a base station. An uplink channel may include a physical uplink control channel (PUCCH) that carries uplink control information (UCI), a physical uplink shared channel (PUSCH) that carries uplink data, or a physical random access channel (PRACH) used for initial network access, among other examples. An uplink reference signal may include a sounding reference signal (SRS), a DMRS, or a phase tracking reference signal (PTRS), among other examples.

An SRS may carry information used for uplink channel estimation, which may be used for scheduling, link adaptation, precoder selection, or beam management, among other examples. A base station may configure one or more SRS resource sets for a UE, and the UE may transmit SRSs on the configured SRS resource sets. An SRS resource set may have a configured usage, such as uplink channel state information (CSI) acquisition, downlink CSI acquisition for reciprocity-based operations, uplink beam management, among other examples. The base station may measure the SRSs, may perform channel estimation based at least in part on the measurements, and may use the SRS measurements to configure communications with the UE.

Downlink channels and downlink reference signals may carry information from a base station to a UE. A downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. A downlink reference signal may include a synchronization signal block (SSB), a CSI reference signal (CSI-RS), a DMRS, a positioning reference signal (PRS), or a PTRS, among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. DMRSs may be used for both downlink communications and uplink communications.

Figure 3:
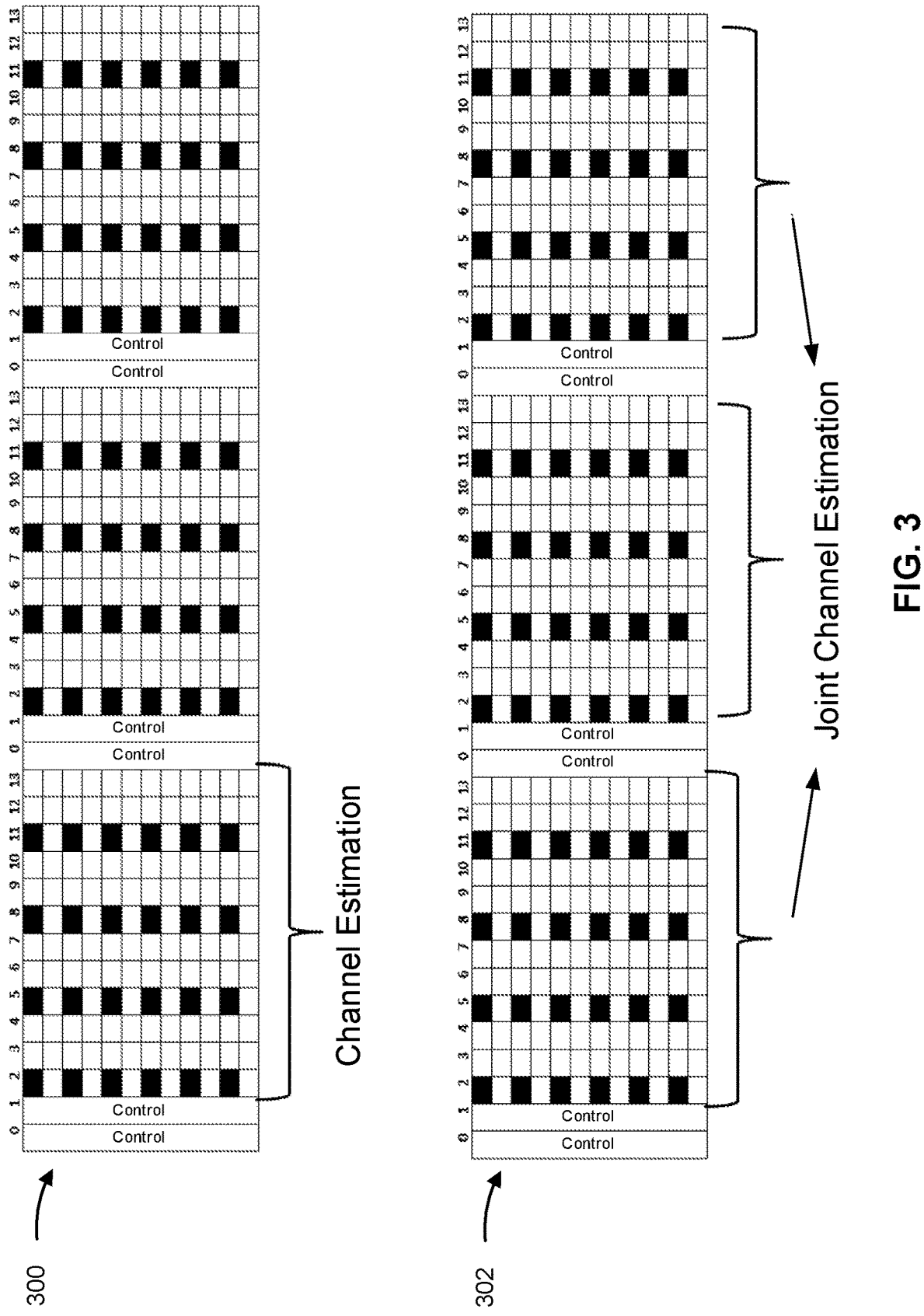
FIG. 3 is a diagram illustrating examples of channel estimation, in accordance with the present disclosure.

FIG. 3 is a diagram illustrating examples 300 and 302 of channel estimation, in accordance with the present disclosure.

Example 300 shows three reception occasions or slots of transport blocks. A receiving UE (or a receiving base station) may use DMRSs in each transport block for channel estimation. That is, channel estimation is performed for each slot, separately. Example 302 shows joint channel estimation, using DMRSs of the three transport blocks together. This may also be referred to as "cross-slot channel estimation" or "DMRS bundling." Joint channel estimation may improve the accuracy of channel estimation, because the estimates involve information across multiple slots. Joint channel estimation may be applicable to low-tier UEs with a reduced number of receive antennas (e.g., one receive antenna) or UEs that are in deep coverage holes.

In order for joint channel estimation to be effective, DMRSs across the slots are to maintain phase continuity. In other words, DMRSs of the same channel estimation process are to have phase coherence from slot to slot. Phase coherence may include phase continuity in the frequency domain across consecutive slots. Signals may have a same phase if the signals have the same frequency and the maxima and minima of the signals are aligned. Signals may be phase coherent if a phase difference between the signals is the same. Maintaining phase continuity may also be referred to as "coherent transmission."

As indicated above, FIG. 3 provides some examples. Other examples may differ from what is described with regard to FIG. 3.

Figure 4:
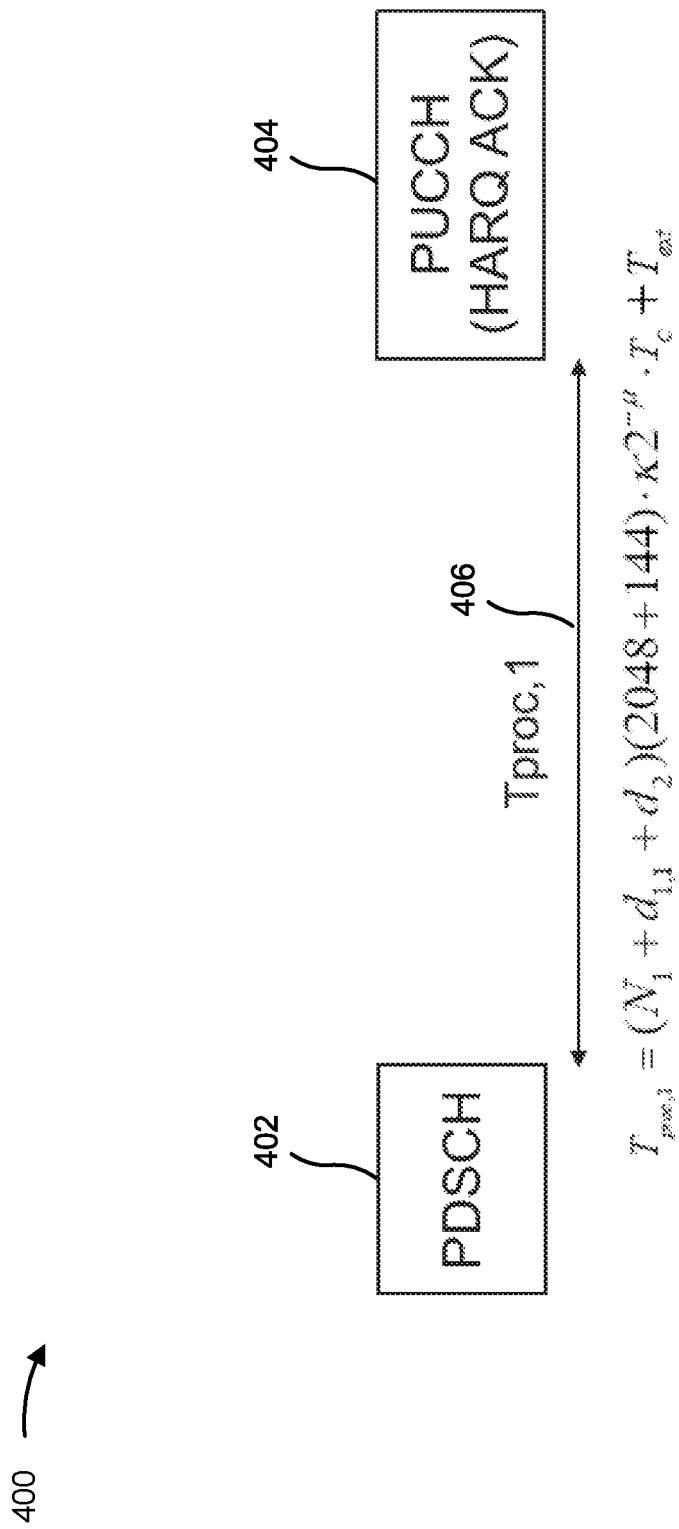
FIG. 4 is a diagram illustrating an example of a processing time for feedback, in accordance with the present disclosure.

FIG. 4 is a diagram illustrating an example 400 of a processing time for feedback, in accordance with the present disclosure.

A UE may receive a communication (e.g., transport block) 402 on a PDSCH in a PDSCH reception occasion. A PDSCH reception occasion may be a time occasion to receive the communication 402, and the PDSCH reception occasion may have a duration of a slot (e.g., type A PDSCH). The PDSCH reception occasion may also have a duration of a sub-slot or a mini-slot (e.g., type B PDSCH).

The UE may provide feedback for the communication 402 received on the PDSCH in the PDSCH reception occasion. The feedback may include a feedback message 404, such as a hybrid automatic repeat request (HARQ) acknowledgement (ACK) transmitted on the PUCCH. The UE may take an amount of processing time 406 to decode the PDSCH and prepare the feedback message 404. The processing time 406 may include time for channel estimation. The processing time 406 may be referred to as "$T_{proc,\,1}$" and may start after the last symbol of the communication 402 on the PDSCH ends. The first uplink symbol of the feedback message 404 may start no earlier than at symbol L1, which may be the next uplink symbol of a cyclic prefix after the processing time 406 ends.

The processing time 406 may be defined as a time duration or a number of symbols. The processing time 406 may be defined according to the equation in 3GPP technical specification (TS) 38.214 Section 5.3:

$$T_{proc,\,1}=(N_1+d_{1,1}+d_2)(2048+144)\cdot \kappa^{2-\mu}\cdot T_c+T_{ext},$$

where $N_1$ is a number of symbols that varies according to subcarrier spacing configuration value μ. As described in TS 38.211 Section 4, μ=0 corresponds to a subcarrier spacing of 15 kHz, μ=1 corresponds to a subcarrier spacing of 30 kHz, μ=2 corresponds to a subcarrier spacing of 60 kHz, μ=3 corresponds to a subcarrier spacing of 120 kHz, and μ=4 corresponds to a subcarrier spacing of 240 kHz. $T_c$ is a basic time unit for NR, κ is a ratio (e.g., 64) between $T_s$ (basic time unit for LTE) and $T_c$. $T_{ext}$ is a calculated value (see TS 38.211 Section 4) for operation with shared spectrum access.

TS 38.214 Section 5.3 describes how the number of symbols for $d_{1,1}$ and $d_2$ are determined, depending on a PDSCH type and a capability of the UE. For example, for the PDSCH mapping type A: if the last symbol of PDSCH is on the i-th symbol of the slot where i<7, then $d_{1,1}=7-i$, otherwise $d_{1,1}=0$. If a PUCCH of a larger priority index would overlap with PUCCH/PUSCH of a smaller priority index, $d_2$ for the PUCCH of a larger priority is set as reported by the UE; otherwise $d_2=0$. For UE processing capability 1 and if the PDSCH is mapping type B: if the number of PDSCH symbols allocated is L≥7, then $d_{1,1}=0$; if the number of PDSCH symbols allocated is L≥4 and L≤6, then $d_{1,1}=7-L$; if the number of PDSCH symbols allocated is L=3 then $d_{1,1}=3+\min(d,1)$, where d is the number of overlapping symbols of the scheduling PDCCH and the scheduled PDSCH; if the number of PDSCH symbols allocated is 2, then $d_{1,1}=3+d$. For UE processing capability 2 and if the PDSCH is mapping type B: if the number of PDSCH symbols allocated is L≥7, then $d_{1,1}=0$; if the number of PDSCH symbols allocated is L≥3 and L≤6, then $d_{1,1}$ is the number of overlapping symbols of the scheduling PDCCH and the scheduled PDSCH; if the number of PDSCH symbols allocated is 2 and if the scheduling PDCCH was in a 3-symbol control resource set (CORESET) and the CORESET and the PDSCH had the same starting symbol, then $d_{1,1}=3$; and otherwise $d_{1,1}$ is the number of overlapping symbols of the scheduling PDCCH and the scheduled PDSCH.

As indicated above, FIG. 4 provides an example. Other examples may differ from what is described with regard to FIG. 4.

FIG. 5 is a diagram illustrating examples 500 and 502 of subcarrier spacing configuration values that contribute to a processing time for feedback, in accordance with the present disclosure.

Example 500 shows Table 5.3-1 of TS 38.214, which applies to UE capability 1. The number of symbols for $N_1$ (PDSCH decoding time) depends on a subcarrier spacing configuration μ. For example, if μ is 1, the number of symbols for $N_1$ is 10 symbols if a DMRS is in a first position (pos0) in a PDSCH repetition occasion and 13 symbols if the DMRS does not start in a first position.

Example 502 shows Table 5.3-2 of TS 38.214, which applies to UE capability 2. Again, the number of symbols for $N_1$ depends on a subcarrier spacing configuration μ. For example, if μ is 1, the number of symbols for $N_1$ is 4.5 symbols.

As indicated above, FIG. 5 provides some examples. Other examples may differ from what is described with regard to FIG. 5.

Figure 6:
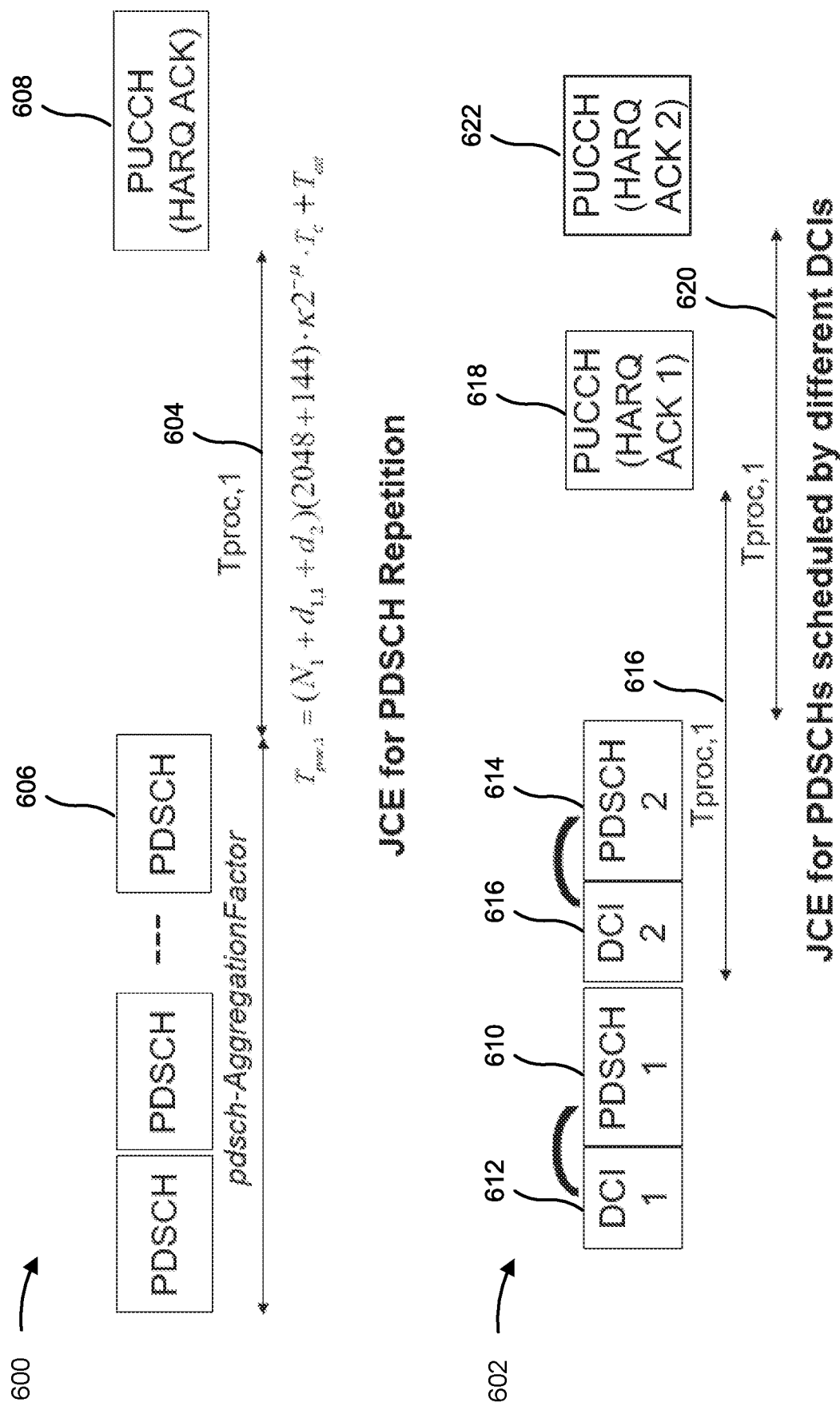
FIG. 6 is a diagram illustrating examples of joint channel estimation, in accordance with the present disclosure.

FIG. 6 is a diagram illustrating examples 600 and 602 of joint channel estimation, in accordance with the present disclosure.

The processing time between a PDSCH repetition occasion and a feedback message, as shown in FIG. 4, may account for channel estimation. However, the processing time does not account for joint channel estimation over multiple PDSCH repetition occasions. Example 600 shows repetitions of a communication (e.g., transport block) on the PDSCH. PDSCH repetition may be indicated with a value, such as a value for pdsch-AggregationFactor, and the UE may buffer the repetitions. The processing time 604 may begin after a last PDSCH repetition occasion 606 and end before a feedback message 608. The processing time 604 does not account for a processing time for joint channel estimation and thus processing may not be complete before a scheduled time to transmit the feedback message 608.

Example 602 shows multiple communications for multiple PDSCH repetition occasions, where each communication is scheduled with a separate DCI. For example, PDSCH 1 610 is scheduled by DCI 1 612 on the PDCCH, and PDSCH 2 614 is scheduled by DCI 2 616 on the PDCCH.

A first processing time 616 may extend between PDSCH 1 610 and HARQ-ACK 1 618, and a second processing time 620 may extend between PDSCH 2 614 and HARQ-ACK 2 622. Again, neither the first processing time 616 nor the second processing time 620 account for joint channel estimation and thus processing may not be complete before a scheduled time to transmit HARQ-ACK 1 618 or HARQ-ACK 2 622. If the UE does not have time to complete processing of the PDSCH, this may affect transmission of a feedback message. If the UE does not have enough processing time, the UE may consume additional processing resources and signaling resources to retransmit the feedback message if the UE fails to transmit the feedback message at the expected time.

According to various aspects described herein, the UE may add an additional offset to the processing time. The additional offset may be associated with joint channel estimation and may include one or more symbols that are added to the processing time. In this way, the UE is able to perform joint channel estimation, in addition to decoding the PDSCH and preparing a feedback message. As a result, the UE conserves processing resources and signaling resources that would otherwise be consumed by retransmitting a feedback message.

In some aspects, the additional offset may extend the number of symbols of $N_1$, or the number of symbols for decoding that are associated with a DMRS position within a PDSCH reception occasion. This may have more of an impact for UE processing capability 2 than for UE processing capability 1, as UE processing capability 2 involves fewer symbols. The additional offset may be based at least in part on a PDSCH type (e.g., PDSCH type A, PDSCH type B), a capability of the UE, and/or a subcarrier spacing.

In some aspects, the additional offset may be a value that is added to the equation for the processing time. For example, the equation may be modified:

$$T_{proc,\,1}=(N_1+d_{1,1}+d_2+d_{10})(2048+144)\cdot\kappa^{2-\mu}\cdot T_c+T_{ext},$$

where the additional offset is represented by $d_{10}$.

In some aspects, the additional offset may be a constant value stored in configuration information (according to a 3GPP standard). In some aspects, the additional offset may vary according to a reported UE capability. The additional offset may be one number for all subcarrier spacings, or one number reported per subcarrier spacing.

As indicated above, FIG. 6 is provides some examples. Other examples may differ from what is described with regard to FIG. 6.

Figure 7:
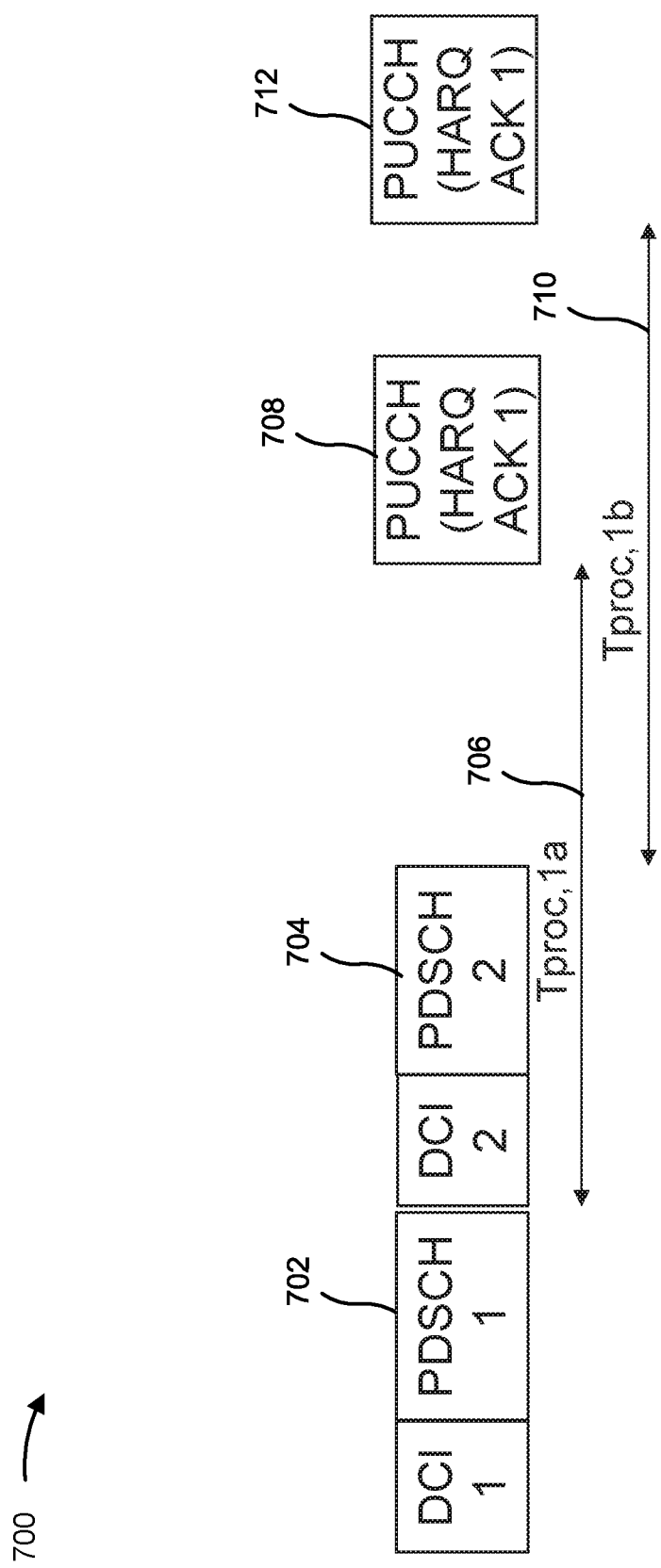
FIG. 7 is a diagram illustrating an example of processing times for channels scheduled with different downlink control information, in accordance with the present disclosure.

FIG. 7 is a diagram illustrating an example 700 of processing times for channels scheduled with different DCIs, in accordance with the present disclosure.

In some aspects, the additional offset associated with joint channel estimation may be based at least in part on a decoding order of a PDSCH repetition occasion among multiple PDSCH repetition occasions. In example 700, PDSCH 1 702 is scheduled with a different DCI than PDSCH 2 704. A first processing time 706 for PDSCH 1 702 (before feedback message 708) may be shorter (or longer) than the second processing time 710 for PDSCH 2 704 (before feedback message 712), because of joint channel estimation of DMRSs in both repetition occasions for PDSCH 1 702 and PDSCH 2 704. A UE may wait for PDSCH 2 704 to perform joint channel estimation. The additional offset in the second processing time 710 may be larger or smaller than the additional offset in the first processing time 706. If there is a third PDSCH, such as PDSCH 3, the processing time after the third PDSCH may be longer than the second processing time, because joint channel estimation may involve more DMRSs.

When PDSCH is scheduled by a DCI in the PDCCH, there may be no explicit timeline for processing the PDCCH. The value $N_1$ for PDSCH processing may be used to implicitly capture a time for processing both the PDCCH and the PDSCH. In some aspects, the additional offset may be based at least in part on whether a base station enabled joint channel estimation by the UE for the PDCCH, in addition to the joint channel estimation for the PDSCH. The additional offset associated with joint channel estimation may be larger when joint channel estimation for the PDCCH is enabled than when joint channel estimation for the PDCCH is not enabled.

As indicated above, FIG. 7 provides an example. Other examples may differ from what is described with regard to FIG. 7.

Figure 8:
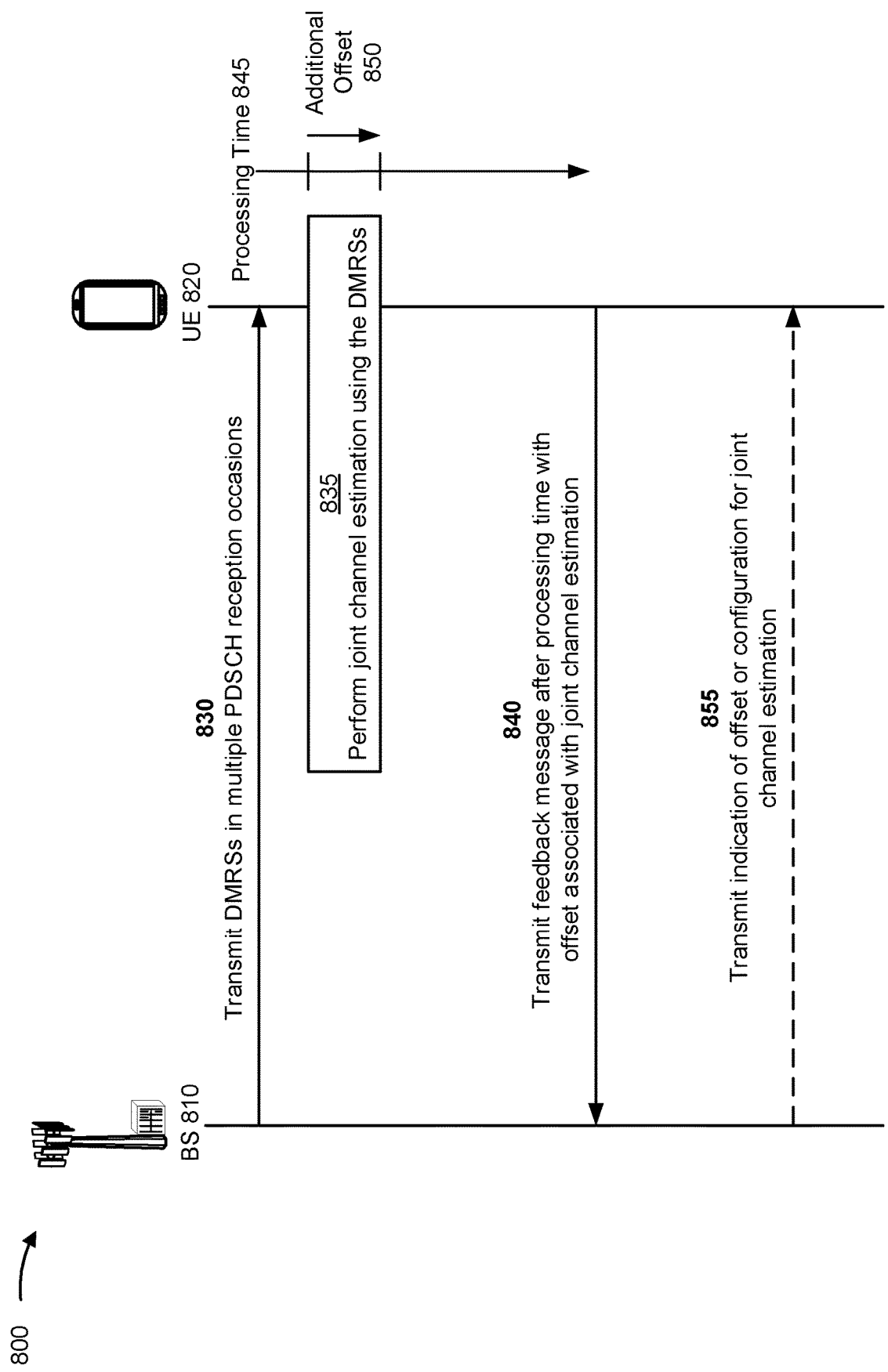
FIG. 8 is a diagram illustrating an example of a processing times for joint channel estimation, in accordance with the present disclosure.

FIG. 8 is a diagram illustrating an example 800 of a processing times for joint channel estimation, in accordance with the present disclosure. As shown in FIG. 8, a base station (BS) 810 (e.g., BS 110) may communicate (e.g., transmit an uplink transmission and/or receive a downlink transmission) with a mobile station, such as UE 820 (e.g., UE 120). UE 820 and BS 810 may be part of a wireless network (e.g., wireless network 100).

According to various aspects described herein, a UE may include an additional offset associated with joint channel estimation of DMRSs in multiple PDSCH reception occasions, in order to provide sufficient processing time for the joint channel estimation. As shown by reference number 830, BS 810 may transmit, to UE 820, DMRSs in multiple PDSCH reception occasions. UE 820 is to process each communication (e.g., transport block) in the multiple PDSCH repetition occasions. As shown by reference number 835, UE 820 may perform joint channel estimation using the DMRSs of the multiple PDSCH repetition occasions.

As shown by reference number 840, UE 820 may transmit a feedback message after a processing time 845 for decoding the PDSCH and preparing the feedback message. The processing time 845 may include an additional offset 850 associated with joint channel estimation of the DMRSs. The additional offset 850 may extend the number of symbols for $N_1$, or the additional offset 850 may be an extra value or variable that is added to the processing time.

In some aspects, as shown by reference number 855, BS 810 may transmit an indication of the additional offset (or a value for the additional offset) and/or a configuration for the joint channel estimation. The configuration may indicate whether UE 820 is to enable joint channel estimation for the PDSCH, and possibly for the PDCCH. The configuration may indicate how to perform joint channel estimation. BS 810 may transmit the indication of the additional offset and/or the configuration before and/or during transmission of the DMRSs in the multiple PDSCH repetition occasions. By including the additional offset 850 associated with joint channel estimation, UE 820 may have an appropriate amount of time to decode the PDSCH of the multiple PDSCH reception occasions, perform joint channel estimation on DMRSs (or other reference signals) in the multiple PDSCH repetition occasions, and prepare the feedback message.

As indicated above, FIG. 8 is provided as an example. Other examples may differ from what is described with regard to FIG. 8.

Figure 9:
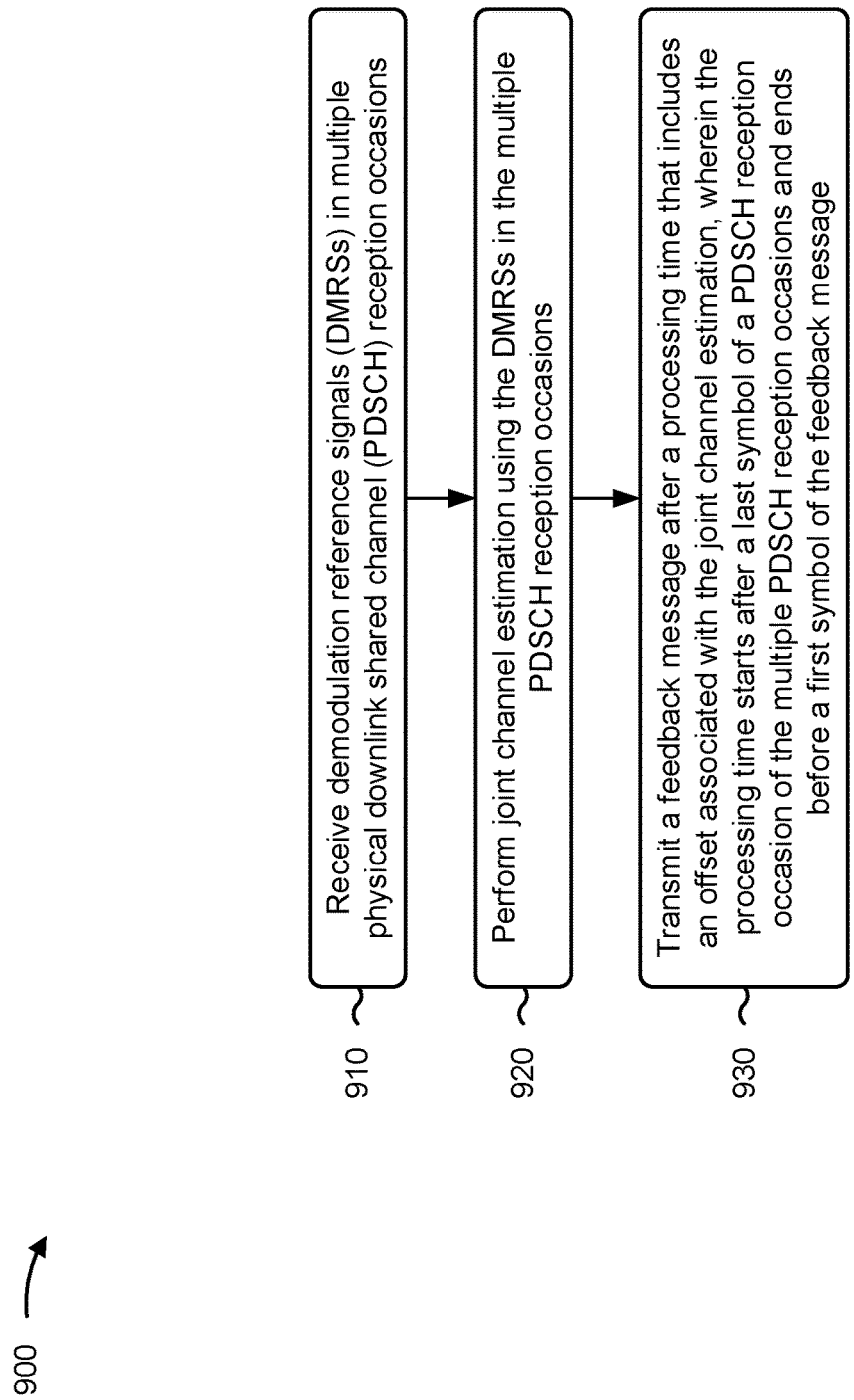
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120 depicted in FIGS. 1-2, UE 820 depicted in FIG. 8) performs operations associated with a processing time for joint channel estimation.

As shown in FIG. 9, in some aspects, process 900 may include receiving DMRSs in multiple PDSCH reception occasions (block 910). For example, the UE (e.g., using reception component 1102 depicted in FIG. 11) may receive DMRSs in multiple PDSCH reception occasions, as described above.

As further shown in FIG. 9, in some aspects, process 900 may include performing joint channel estimation using the DMRSs in the multiple PDSCH reception occasions (block 920). For example, the UE (e.g., using channel estimation component 1108 depicted in FIG. 11) may perform joint channel estimation using the DMRSs in the multiple PDSCH reception occasions, as described above.

As further shown in FIG. 9, in some aspects, process 900 may include transmitting a feedback message after a processing time that includes an offset associated with the joint channel estimation (block 930). For example, the UE (e.g., using transmission component 1104 depicted in FIG. 11) may transmit a feedback message after a processing time that includes an offset associated with the joint channel estimation, as described above. In some aspects, the processing time may start after a last symbol of a PDSCH reception occasion of the multiple PDSCH reception occasions and end before a first symbol of the feedback message.

Process 900 may include additional aspects, such as any single aspect or any combination of aspects described below and/or in connection with one or more other processes described elsewhere herein.

In a first aspect, each PDSCH reception occasion has a duration of a slot.

In a second aspect, alone or in combination with the first aspect, each PDSCH reception occasion has a duration of a sub-slot or a mini-slot.

In a third aspect, alone or in combination with one or more of the first and second aspects, the offset extends a quantity of symbols for decoding that are associated with a DMRS position within a PDSCH reception occasion.

In a fourth aspect, alone or in combination with one or more of the first through third aspects, the offset is based at least in part on a subcarrier spacing.

In a fifth aspect, alone or in combination with one or more of the first through fourth aspects, the offset is based at least in part on a PDSCH type.

In a sixth aspect, alone or in combination with one or more of the first through fifth aspects, the offset is based at least in part on a capability of the UE.

In a seventh aspect, alone or in combination with one or more of the first through sixth aspects, the PDSCHs in the multiple PDSCH reception occasions are repetitions of the same PDSCH.

In an eighth aspect, alone or in combination with one or more of the first through seventh aspects, the PDSCHs in the multiple PDSCH reception occasions are different PDSCHs, each scheduled by different DCI.

In a ninth aspect, alone or in combination with one or more of the first through eighth aspects, the offset is based at least in part on an order of the PDSCH reception occasions with respect to other PDSCH reception occasions of the multiple PDSCH reception occasions.

In a tenth aspect, alone or in combination with one or more of the first through ninth aspects, the offset is based at least in part on whether joint channel estimation is enabled for multiple PDCCH reception occasions in addition to the joint channel estimation for the DMRSs in the multiple PDSCH reception occasions.

In an eleventh aspect, alone or in combination with one or more of the first through tenth aspects, the offset is received from a base station.

In a twelfth aspect, alone or in combination with one or more of the first through eleventh aspects, the offset is obtained from stored configuration information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
FIG. 10 is a diagram illustrating an example process performed, for example, by a base station, in accordance with the present disclosure.

FIG. 10 is a diagram illustrating an example process 1000 performed, for example, by a base station, in accordance with the present disclosure. Example process 1000 is an example where the base station (e.g., base station 110 depicted in FIGS. 1-2, BS 810 depicted in FIG. 8) performs operations associated with a processing time for joint channel estimation.

As shown in FIG. 10, in some aspects, process 1000 may include transmitting, to a UE, DMRSs in multiple PDSCH reception occasions (block 1010). For example, the base station (e.g., using transmission component 1204 depicted in FIG. 12) may transmit, to a UE, DMRSs in multiple PDSCH reception occasions, as described above.

As further shown in FIG. 10, in some aspects, process 1000 may include receiving, from the UE, a feedback message based at least in part on a processing time at the UE (block 1020). For example, the base station (e.g., using reception component 1202 depicted in FIG. 12) may receive, from the UE, a feedback message based at least in part on a processing time at the UE, as described above. In some aspects, the processing time may include an offset associated with joint channel estimation of the DMRSs Process 1000 may include additional aspects, such as any single aspect or any combination of aspects described below and/or in connection with one or more other processes described elsewhere herein.

In a first aspect, process 1000 includes transmitting, to the UE, a configuration for the joint channel estimation.

In a second aspect, alone or in combination with the first aspect, process 1000 includes transmitting, to the UE, an indication of whether joint channel estimation is enabled for the DMRSs in the multiple PDSCH reception occasions.

In a third aspect, alone or in combination with one or more of the first and second aspects, process 1000 includes transmitting the offset to the UE.

In a fourth aspect, alone or in combination with one or more of the first through third aspects, the offset extends a quantity of symbols for decoding that are associated with a DMRS position within a slot.

In a fifth aspect, alone or in combination with one or more of the first through fourth aspects, the offset is based at least in part on a subcarrier spacing.

In a sixth aspect, alone or in combination with one or more of the first through fifth aspects, the offset is based at least in part on a PDSCH type.

In a seventh aspect, alone or in combination with one or more of the first through sixth aspects, the offset is based at least in part on a capability of the UE.

In an eighth aspect, alone or in combination with one or more of the first through seventh aspects, the PDSCHs in the multiple PDSCH reception occasions are repetitions of the same PDSCH.

In a ninth aspect, alone or in combination with one or more of the first through eighth aspects, PDSCHs in the multiple PDSCH reception occasions are different PDSCHs, each scheduled by different DCI.

In a tenth aspect, alone or in combination with one or more of the first through ninth aspects, the offset is based at least in part on an order of the PDSCH reception occasions with respect to other PDSCH reception occasions of the multiple PDSCH reception occasions.

In an eleventh aspect, alone or in combination with one or more of the first through tenth aspects, the offset is based at least in part on whether joint channel estimation is enabled for multiple PDCCH reception occasions in addition to the joint channel estimation for the DMRSs in the multiple PDSCH reception occasions.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
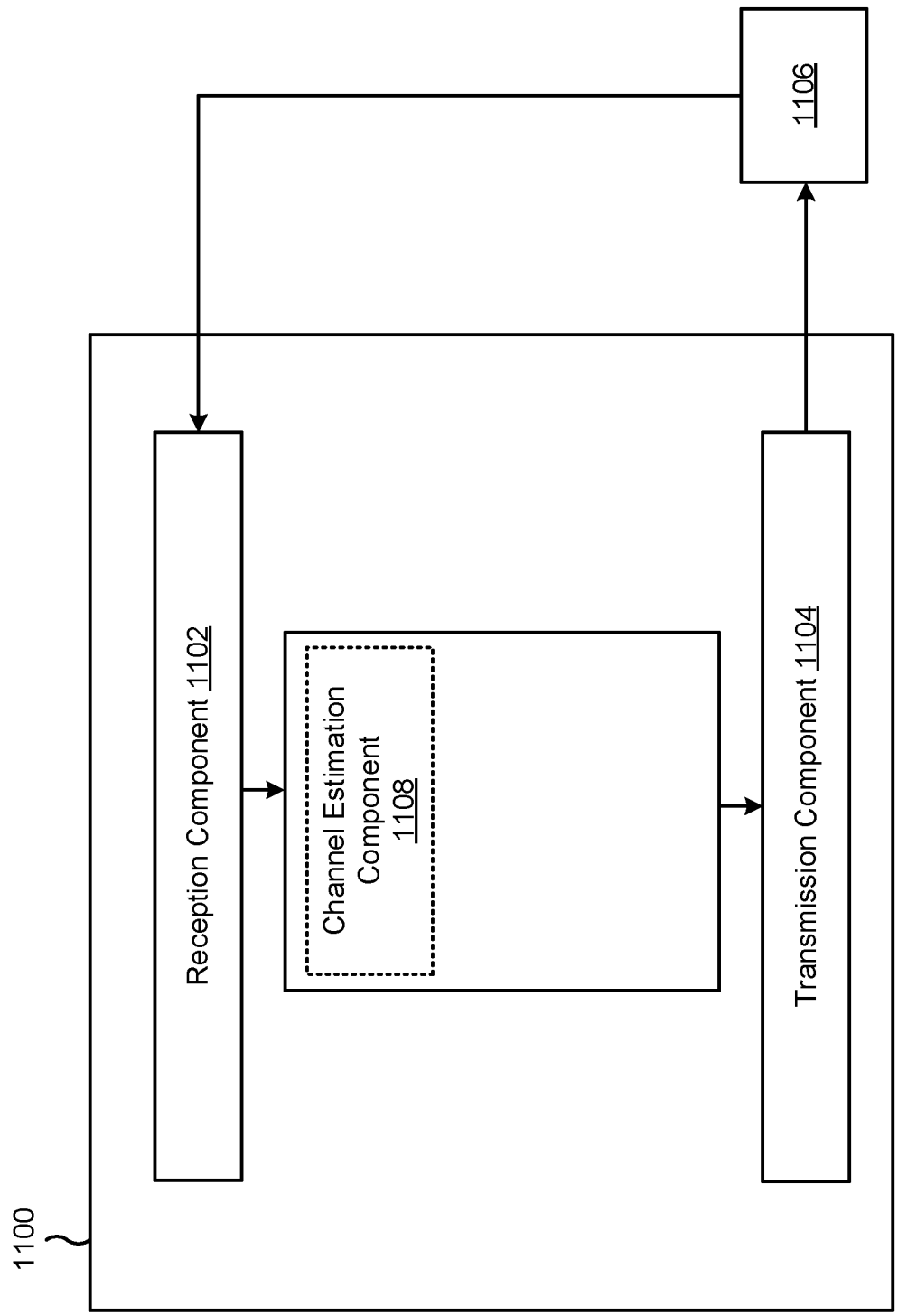
FIGS. 11-12 are block diagrams of example apparatuses for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a channel estimation component 1108, among other examples.

In some aspects, the apparatus 1100 may be configured to perform one or more operations described herein in connection with FIGS. 1-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The reception component 1102 may receive DMRSs in multiple PDSCH reception occasions. The channel estimation component 1108 may perform joint channel estimation using the DMRSs in the multiple PDSCH reception occasions. The transmission component 1104 may transmit a feedback message after a processing time that includes an offset associated with the joint channel estimation, where the processing time starts after a last symbol of a PDSCH reception occasion of the multiple PDSCH reception occasions and ends before a first symbol of the feedback message.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
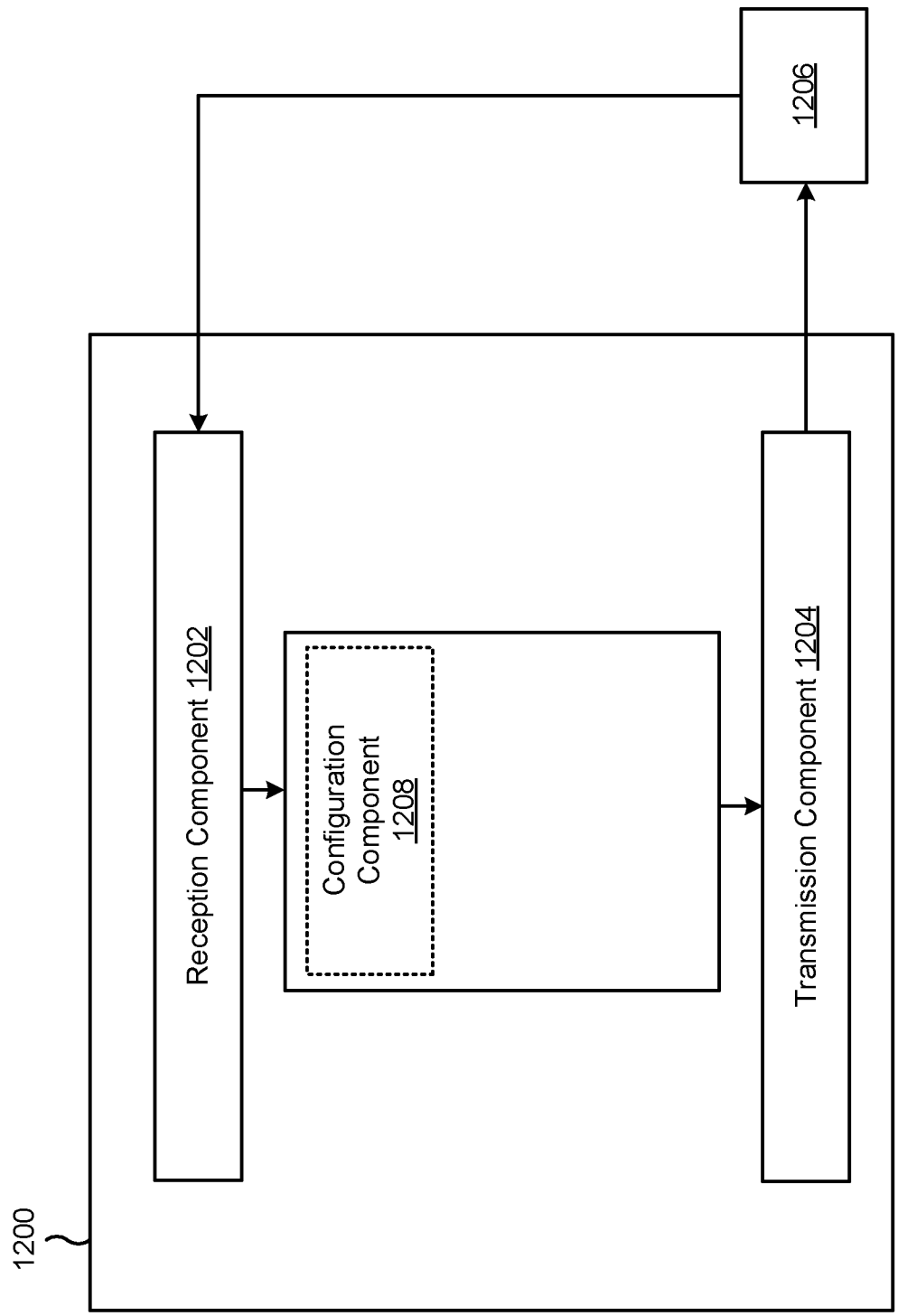

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a configuration component 1208, among other examples.

In some aspects, the apparatus 1200 may be configured to perform one or more operations described herein in connection with FIGS. 1-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The transmission component 1204 may transmit, to a UE, DMRSs in multiple PDSCH reception occasions. The reception component 1202 may receive, from the UE, a feedback message based at least in part on a processing time at the UE, where the processing time includes an offset associated with joint channel estimation of the DMRSs.

The configuration component 1208 may generate a configuration for joint channel estimation and/or an offset for the processing time that is associated with the joint channel estimation based at least in part on a UE capability, a subcarrier spacing, a PDSCH type, and/or traffic conditions. The transmission component 1204 may transmit, to the UE, a configuration for the joint channel estimation. The transmission component 1204 may transmit, to the UE, an indication of whether joint channel estimation is enabled for the DMRSs in the multiple PDSCH reception occasions. The transmission component 1204 may transmit the offset to the UE.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: receiving demodulation reference signals (DMRSs) in multiple physical downlink shared channel (PDSCH) reception occasions; performing joint channel estimation using the DMRSs in the multiple PDSCH reception occasions; and transmitting a feedback message after a processing time that includes an offset associated with the joint channel estimation, wherein the processing time starts after a last symbol of a PDSCH reception occasion of the multiple PDSCH reception occasions and ends before a first symbol of the feedback message.

Aspect 2: The method of Aspect 1, wherein each PDSCH reception occasion has a duration of a slot.

Aspect 3: The method of Aspect 1, wherein each PDSCH reception occasion has a duration of a sub-slot or a mini-slot.

Aspect 4: The method of any of Aspects 1-3, wherein the offset extends a quantity of symbols for decoding that are associated with a DMRS position within a PDSCH reception occasion.

Aspect 5: The method of any of Aspects 1-4, wherein the offset is based at least in part on a subcarrier spacing.

Aspect 6: The method of any of Aspects 1-5, wherein the offset is based at least in part on a PDSCH type.

Aspect 7: The method of any of Aspects 1-6, wherein the offset is based at least in part on a capability of the UE.

Aspect 8: The method of any of Aspects 1-7, wherein the PDSCHs in the multiple PDSCH reception occasions are repetitions of the same PDSCH.

Aspect 9: The method of any of Aspects 1-7, wherein the PDSCHs in the multiple PDSCH reception occasions are different PDSCHs, each scheduled by different downlink control information.

Aspect 10: The method of Aspect 9, wherein the offset is based at least in part on an order of the PDSCH reception occasions with respect to other PDSCH reception occasions of the multiple PDSCH reception occasions.

Aspect 11: The method of any of Aspects 1-10, wherein the offset is based at least in part on whether joint channel estimation is enabled for multiple physical downlink control channel (PDCCH) reception occasions in addition to the joint channel estimation for the DMRSs in the multiple PDSCH reception occasions.

Aspect 12: The method of any of Aspects 1-11, wherein the offset is received from a base station.

Aspect 13: The method of any of Aspects 1-11, wherein the offset is obtained from stored configuration information.

Aspect 14: A method of wireless communication performed by a base station, comprising: transmitting, to a user equipment (UE), demodulation reference signals (DMRSs) in multiple physical downlink shared channel (PDSCH) reception occasions; and receiving, from the UE, a feedback message based at least in part on a processing time at the UE, wherein the processing time includes an offset associated with joint channel estimation of the DMRSs.

Aspect 15: The method of Aspect 14, further comprising transmitting, to the UE, a configuration for the joint channel estimation.

Aspect 16: The method of Aspect 15, further comprising transmitting, to the UE, an indication of whether joint channel estimation is enabled for the DMRSs in the multiple PDSCH reception occasions.

Aspect 17: The method of any of Aspects 14-16, further comprising transmitting the offset to the UE.

Aspect 18: The method of any of Aspects 14-17, wherein the offset extends a quantity of symbols for decoding that are associated with a DMRS position within a slot.

Aspect 19: The method of any of Aspects 14-18, wherein the offset is based at least in part on a subcarrier spacing.

Aspect 20: The method of any of Aspects 14-19, wherein the offset is based at least in part on a PDSCH type.

Aspect 21: The method of any of Aspects 14-20, wherein the offset is based at least in part on a capability of the UE.

Aspect 22: The method of any of Aspects 14-21, wherein the PDSCHs in the multiple PDSCH reception occasions are repetitions of the same PDSCH.

Aspect 23: The method of any of Aspects 14-21, wherein PDSCHs in the multiple PDSCH reception occasions are different PDSCHs, each scheduled by different downlink control information.

Aspect 24: The method of Aspect 23, wherein the offset is based at least in part on an order of the PDSCH reception occasions with respect to other PDSCH reception occasions of the multiple PDSCH reception occasions.

Aspect 25: The method of any of Aspects 14-124, wherein the offset is based at least in part on whether joint channel estimation is enabled for multiple physical downlink control channel (PDCCH) reception occasions in addition to the joint channel estimation for the DMRSs in the multiple PDSCH reception occasions.

Aspect 26: An apparatus for wireless communication at a device, comprising a processor; memory coupled with the processor; and instructions stored in the memory and executable by the processor to cause the apparatus to perform the method of one or more Aspects of Aspects 1-25.

Aspect 27: A device for wireless communication, comprising a memory and one or more processors coupled to the memory, the memory and the one or more processors configured to perform the method of one or more Aspects of Aspects 1-25.

Aspect 28: An apparatus for wireless communication, comprising at least one means for performing the method of one or more Aspects of Aspects 1-25.

Aspect 29: A non-transitory computer-readable medium storing code for wireless communication, the code comprising instructions executable by a processor to perform the method of one or more Aspects of Aspects 1-25.

Aspect 30: A non-transitory computer-readable medium storing a set of instructions for wireless communication, the set of instructions comprising one or more instructions that, when executed by one or more processors of a device, cause the device to perform the method of one or more Aspects of Aspects 1-25.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive demodulation reference signals (DMRSs) in multiple physical downlink shared channel (PDSCH) reception occasions;
perform joint channel estimation using the DMRSs in the multiple PDSCH reception occasions; and
transmit a feedback message after a PDSCH processing time including an offset that is associated with the joint channel estimation and that extends the PDSCH processing time associated with the joint channel estimation, wherein the PDSCH processing time starts after a last symbol of a PDSCH reception occasion of the multiple PDSCH reception occasions and ends before a first symbol of the feedback message.

2. The UE of claim 1, wherein each PDSCH reception occasion of the multiple PDSCH reception occasions has a duration of a slot.

3. The UE of claim 1, wherein each PDSCH reception occasion of the multiple PDSCH reception occasions has a duration of a sub-slot or a mini-slot.

4. The UE of claim 1, wherein the offset extends a quantity of symbols for decoding that are associated with a DMRS position within a PDSCH reception occasion of the multiple PDSCH reception occasions.

5. The UE of claim 1, wherein the offset is based at least in part on a subcarrier spacing.

6. The UE of claim 1, wherein the offset is based at least in part on a PDSCH type.

7. The UE of claim 1, wherein the offset is based at least in part on a capability of the UE.

8. The UE of claim 1, wherein PDSCHs in the multiple PDSCH reception occasions are repetitions of the same PDSCH.

9. The UE of claim 1, wherein PDSCHs in the multiple PDSCH reception occasions are different PDSCHs, each scheduled by different downlink control information.

10. The UE of claim 9, wherein the offset is based at least in part on an order of the PDSCH reception occasions with respect to other PDSCH reception occasions of the multiple PDSCH reception occasions.

11. The UE of claim 1, wherein the offset is based at least in part on whether joint channel estimation is enabled for multiple physical downlink control channel (PDCCH) reception occasions in addition to the joint channel estimation for the DMRSs in the multiple PDSCH reception occasions.

12. The UE of claim 1, wherein the offset is received from a network entity.

13. The UE of claim 1, wherein the offset is obtained from stored configuration information.

14. A network entity for wireless communication, comprising:
one or more memories; and
one or more processors, coupled to the one or more memories, configured to:
transmit, for a user equipment (UE), demodulation reference signals (DMRSs) in multiple physical downlink shared channel (PDSCH) reception occasions; and
receive a feedback message based at least in part on a PDSCH processing time at the UE, wherein the PDSCH processing time includes an offset that is associated with joint channel estimation of the DMRSs and that extends the PDSCH processing time associated with the joint channel estimation, and wherein the PDSCH processing time starts after a last symbol of a PDSCH reception occasion of the multiple PDSCH reception occasions and ends before a first symbol of the feedback message.

15. The network entity of claim 14, wherein the one or more processors are further configured to transmit, to the UE, a configuration for the joint channel estimation.

16. The network entity of claim 15, wherein the one or more processors are further configured to transmit, to the UE, an indication of whether joint channel estimation is enabled for the DMRSs in the multiple PDSCH reception occasions.

17. The network entity of claim 14, wherein the one or more processors are further configured to transmit the offset to the UE.

18. The network entity of claim 14, wherein the offset extends a quantity of symbols for decoding that are associated with a DMRS position within a slot.

19. The network entity of claim 14, wherein the offset is based at least in part on a subcarrier spacing.

20. The network entity of claim 14, wherein the offset is based at least in part on a PDSCH type.

21. The network entity of claim 14, wherein the offset is based at least in part on a capability of the UE.

22. The network entity of claim 14, wherein PDSCHs in the multiple PDSCH reception occasions are repetitions of the same PDSCH.

23. The network entity of claim 14, wherein PDSCHs in the multiple PDSCH reception occasions are different PDSCHs, each scheduled by different downlink control information.

24. The network entity of claim 23, wherein the offset is based at least in part on an order of the PDSCH reception occasions with respect to other PDSCH reception occasions of the multiple PDSCH reception occasions.

25. The network entity of claim 14, wherein the offset is based at least in part on whether joint channel estimation is enabled for multiple physical downlink control channel (PDCCH) reception occasions in addition to the joint channel estimation for the DMRSs in the multiple PDSCH reception occasions.

26. A method of wireless communication performed by a user equipment (UE), comprising:
receiving demodulation reference signals (DMRSs) in multiple physical downlink shared channel (PDSCH) reception occasions;
performing joint channel estimation using the DMRSs in the multiple PDSCH reception occasions; and
transmitting a feedback message after a PDSCH processing time including an offset that is associated with the joint channel estimation and that extends the PDSCH processing time associated with the joint channel estimation, wherein the PDSCH processing time starts after a last symbol of a PDSCH reception occasion of the multiple PDSCH reception occasions and ends before a first symbol of the feedback message.

27. The method of claim 26, wherein the offset extends a quantity of symbols for decoding that are associated with a DMRS position within a PDSCH reception occasion of the multiple PDSCH reception occasions.

28. The method of claim 26, wherein the offset is based at least in part on one or more of a subcarrier spacing, a PDSCH type, or a capability of the UE.

29. A method of wireless communication performed by a network entity, comprising:

transmitting, for a user equipment (UE), demodulation reference signals (DMRSs) in multiple physical downlink shared channel (PDSCH) reception occasions; and receiving a feedback message based at least in part on a PDSCH processing time at the UE, wherein the PDSCH processing time includes an offset that is associated with joint channel estimation of the DMRSs and that extends the PDSCH processing time associated with the joint channel estimation, and wherein the PDSCH processing time starts after a last symbol of a PDSCH reception occasion of the multiple PDSCH reception occasions and ends before a first symbol of the feedback message.

30. The method of claim 29, wherein the offset extends a quantity of symbols for decoding that are associated with a DMRS position within a slot.

\* \* \* \* \*